Feb. 9, 1932.   H. D. GEYER ET AL   1,844,755
RESILIENT MOUNTING BRACKET
Filed June 29, 1929    2 Sheets-Sheet 2

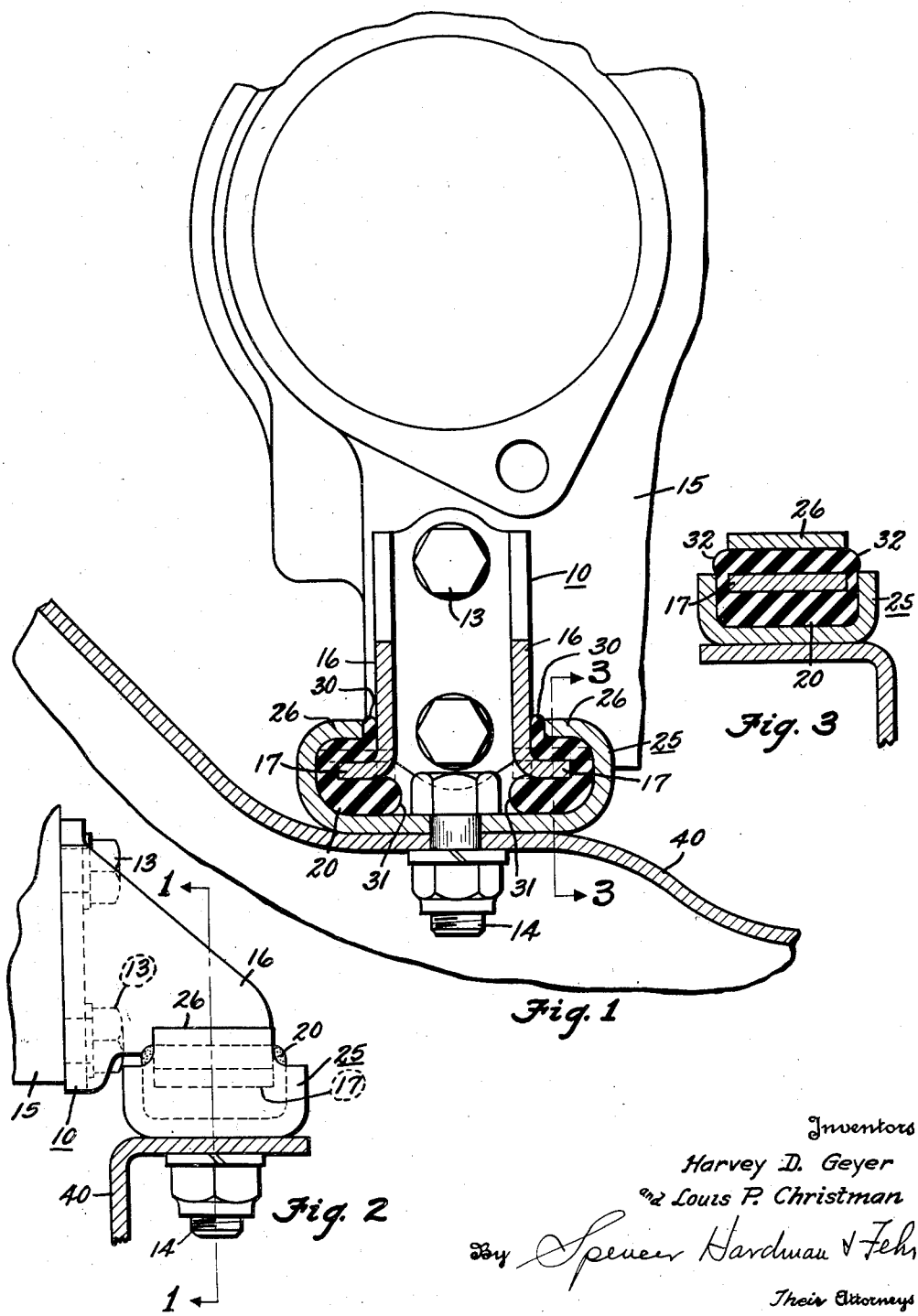

Inventors
Harvey D. Geyer
and Louis P. Christman
By Spencer Hardman & Fehr
Their Attorneys Patented Feb. 9, 1932

1,844,755

UNITED STATES PATENT OFFICE

HARVEY D. GEYER AND LOUIS P. CHRISTMAN, OF DAYTON, OHIO, ASSIGNORS TO THE INLAND MANUFACTURING COMPANY, OF DAYTON, OHIO, A CORPORATION OF DELAWARE

RESILIENT MOUNTING BRACKET

Application filed June 29, 1929. Serial No. 374,775.

This invention relates to metal-isolating mounting units adapted to be manufactured as a unit and readily assembled in place in the manner of an ordinary metal mounting bracket for mounting any member upon its support.

An object of the invention is to provide a very simple and efficient metal-isolating resilient connector unit which can be cheaply manufactured in quantity.

Another object is to provide such a resilient mounting unit which can be substituted for an ordinary angle mounting bracket without any change being necessary in the location of the bolt holes which have already been provided in the parts to be connected by such bracket. In an ordinary angle bracket the bolt holes for the attaching bolts or screws are usually too close together to permit the insertion therebetween of a special resilient mounting unit of any previously known design. A feature of this invention is that the attaching bolts or screws for securing the unit to the respective parts to be connected thereby may still be very close together, and hence this resilient mounting unit may be used in locations which are much too cramped to permit the use of other known designs of resilient connectors. For instance, the resilient connector of this invention is suitable to be substituted for the small angle brackets now used on the present Chevrolet automobile for mounting the engine upon the closely adjacent chassis frame member.

Further objects and advantages of the present invention will be apparent from the following description, reference being had to the accompanying drawings, wherein a preferred embodiment of one form of the present invention is clearly shown.

In the drawings:

Fig. 1 shows the resilient mounting bracket unit of this invention assembled in place and connecting a portion of an automobile engine upon its supporting chassis frame member. The bracket unit is shown in section on line 1—1 of Fig, 2.

Fig. 2 is a side elevation of the bracket shown in Fig. 1.

Fig. 3 is a vertical section on line 3—3 of Fig. 1.

Figure 5:
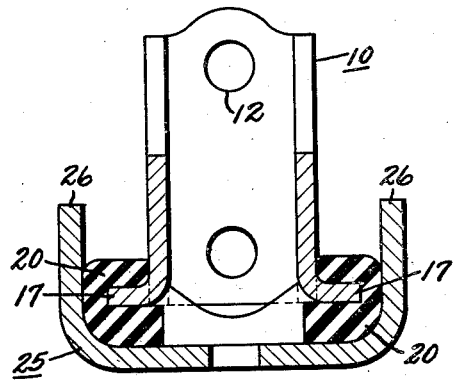

Fig. 5 illustrates a step in the assembling of the unit. The parts are in position for the final step of bending down the end portions of the metal cup to compress the rubber blocks and permanently assemble the parts together. The section line along which this view is taken is the same as that of Fig. 1.

Figure 6:
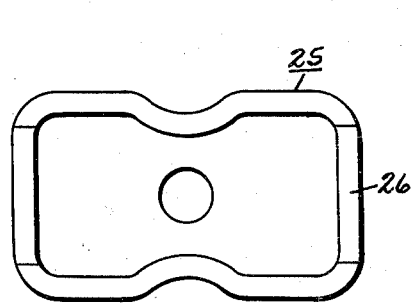
Figure 4:
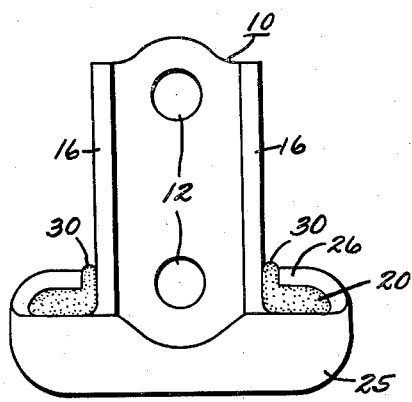
Fig. 4 shows a front view of the bracket unit alone, as completely assembled and sold by the manufacturer.
Figure 7:
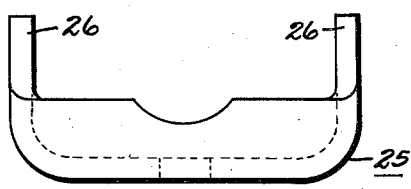

Figs. 6 and 7 are top and side views respectively of the pressed metal cup, prior to the final bending step.

Figure 8:
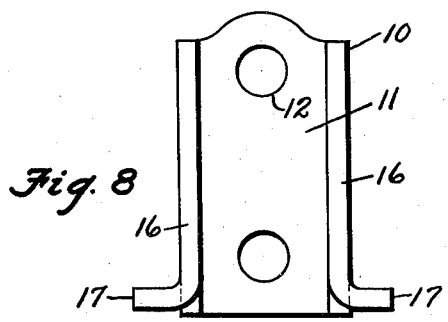
Figure 9:
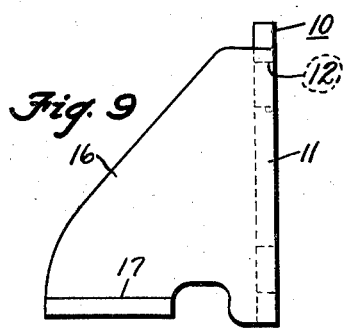

Figs. 8 and 9 are front and side views respectively of the vertical leg portion shown attached to the engine in Fig. 1.

Figure 10:

Fig. 10 is a section through one of the molded soft rubber blocks prior to any deformation thereof.

Similar reference characters refer to similar parts throughout the various views.

Numeral 10 marks the pressed metal bracket, shown separately in Figs. 8 and 9. Bracket 10 has a back wall 11 having two bolt holes 12 therein for the bolts 13 whereby the bracket is rigidly fixed to a vertical surface of a portion 15 of the engine. Bracket 10 has two marginal parallel webs 16 projecting out from the back wall 11 and preferably integral therewith. The lower portion of each web 16 is bent over to form the two laterally projecting horizontal flanges 17. Inserted upon these two flanges 17 are two molded soft rubber blocks 20 which are molded to the form shown in Fig. 10. The recess 21 which is molded therein receives the flange 17 with a snug fit, as clearly shown in Fig. 5. Next, the bottom pressed metal cup 25, which is shown in detail in Figs. 6 and 7, is slipped upon the assembled rubber blocks 20 and flanges 17 to the position shown in Fig. 5. The rubber blocks in this position are yet not compressed, however, they fit quite snugly in the opposite ends of the cup 25 since they are molded to a corresponding shape.

The next step in the manufacture is to put the parts as shown in Fig. 5 in a die press and bend down the upstanding portions 26 to the position shown in Figs. 1 to 4, whereby the rubber blocks 20 are put under high compression and the parts of the unit are permanently assembled together in such manner that no one can make any adjustments or undesirable changes in the compression under which the rubber is held. When the rubber blocks 20 are thus compressed, the rubber flows upwardly at the areas 30 (see Fig. 1) to partially or entirely fill the crevice between the end of portion 26 and the side of web 16. Also the rubber bulges laterally toward the center of cup 25 at the points 31, as clearly shown in Fig. 1, since it is unconfined at these surfaces. This initial distortion of the resilient rubber by compression is an important feature since by this means the rubber supports itself at its unconfined surfaces and further bulging at these points is substantially prevented when the load upon the connector is greatly increased. In other words, if the rubber were permitted to bulge out at its unconfined areas with each increase of load and then flow back in when the load decreases, such continual movement of the rubber would soon cause it to wear away or otherwise rapidly deteriorate. By maintaining a constant high compression thereupon which is greater or substantially equal to all normal loads which it will experience, such continuous or frequent flowing or distortion of the rubber at its unconfined surfaces is avoided and hence the life of the rubber is greatly increased. It will be obvious that the constant bulging of the rubber along the unconfined corners 32 (see Fig. 3) will prevent dirt, grit or other foreign matter finding lodgment at these crevices and working down between the rubber and metal cup 25 when it would cause rapid wear upon the rubber.

In this connector unit as thus made, the cup 25 is firmly but yieldably supported by the bracket 10 and is completely isolated therefrom by the resilient rubber blocks 20. Considering the unit in its entirety, it is in effect an angle bracket wherein the part 10 constitutes the vertical leg of the bracket and the part 25 constitutes the other or horizontal leg of the bracket, which horizontal leg is resiliently secured to the vertical leg by the interposition of the soft resilient rubber blocks 20.

This angle bracket unit is simply fixed to the parts 15 and 40 connected thereby by the screws or bolts 13 and 14 just as in the case of an ordinary metal angle bracket. It is to be noted from Fig. 1 that the heads of bolts 13 come very close to the head of bolt 14, yet there is sufficient clearance to properly insert and tighten these bolts. It is thus seen that this resilient unit may be used in very cramped places since the parts thereof along the central portion where the attaching bolts are located are not bulky, but in fact may be as small as in the case of a simple metal angle bracket.

The chief purpose of the device is to prevent transmission of vibrations from the engine portion 15 to the chassis frame portion 40 which supports the engine. The resiliency of the rubber 20 prevents such transmission and also tends to damp out the engine vibrations.

While the form of embodiment of the present invention as herein disclosed constitutes a preferred form, it is to be understood that other forms might be adopted, all coming within the scope of the claims which follow.

What is claimed is as follows:

1. A metal-isolating mounting unit for mounting a member upon a support and preventing transmission of vibrations therebetween, comprising: a bracket adapted to be rigidly fixed to said member and having two spaced and oppositely projecting horizontal flanges, two resilient rubber blocks each having a recess therein corresponding in shape to said flanges and which snugly receive said flanges, a metal cup fitting snugly about said rubber blocks and having end portions thereon which are bent down upon said blocks to highly compress the same and permanently assemble said parts together to form a unit, said cup being isolated from said bracket by said blocks.

2. A metal-isolating mounting unit for mounting a member upon a support and preventing transmission of vibrations therebetween, comprising: an angle bracket adapted to be fixed to a vertical surface on said member and having two spaced and oppositely projecting horizontal flanges, a resilient rubber block encasing each of said spaced flanges, a metal cup encasing both of said rubber blocks and spaced flanges therein and having end portions bent to permanently highly compress each of said blocks, and means intermediate said blocks for fixing said cup to said support.

3. A metal-isolating mounting unit for mounting a member upon a support and preventing transmission of vibrations therebetween, comprising: an angle bracket having a vertical wall and holes therein for receiving bolts or the like whereby said bracket may be fixed to said member, said bracket having two flanges projecting laterally on either side from said vertical wall, resilient non-metallic blocks encasing each of said flanges, a pressed metal part encasing both of said blocks and spaced flanges therein and having end portions bent down and permanently compressing said blocks, and means intermediate said blocks for fixing said part to said support.

4. A metal-isolating mounting unit for mounting a member upon a support and preventing transmission of vibrations therebetween, comprising: an angle bracket adapted to be fixed to a vertical surface on said member and having two spaced and oppositely projecting horizontal flanges, a resilient rubber block encasing each of said spaced flanges, a metal cup encasing both of said rubber blocks and spaced flanges therein and having end portions bent to permanently compress each of said blocks, and means for fixing said metal cup to said support.

In testimony whereof we hereto affix our signatures.

HARVEY D. GEYER.
LOUIS P. CHRISTMAN.